United States Patent Office 3,515,765
Patented June 2, 1970

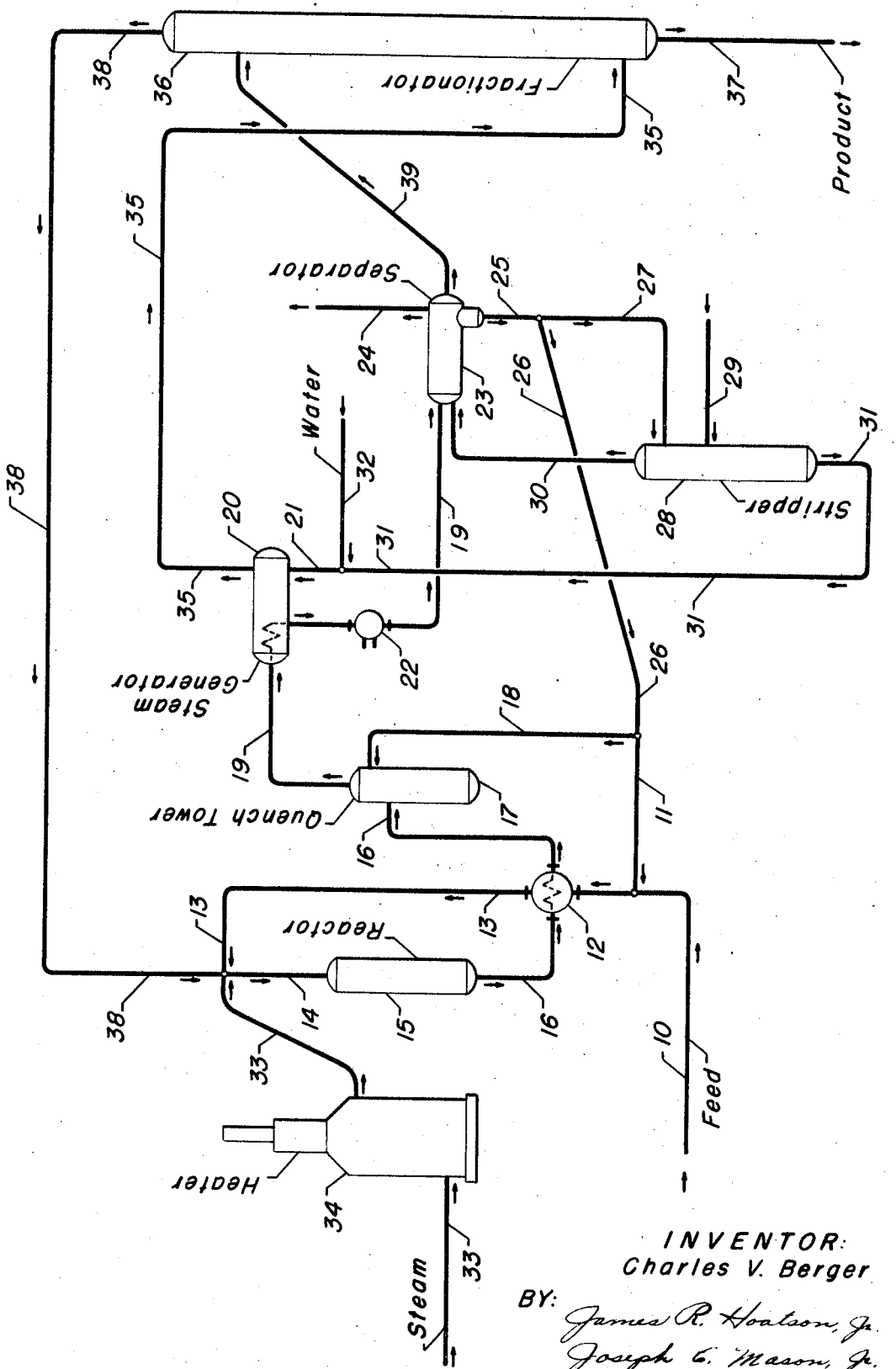

3,515,765
CATALYTIC CONVERSION PROCESS
Charles V. Berger, Western Springs, Ill., assignor to Universal Oil Products Company, Des Plaines, Ill., a corporation of Delaware
Filed May 21, 1968, Ser. No. 730,774
Int. Cl. C07c 5/18, 15/10
U.S. Cl. 260—669                                    5 Claims

ABSTRACT OF THE DISCLOSURE

Process for converting hydrocarbons, such as ethylbenzene to styrene wherein subatmospheric pressure steam is generated, preferably from the heat of the quenched reaction zone effluent. The resulting low pressure steam is used directly as a heating and stripping medium in subsequent recovery fractionation columns.

BACKGROUND OF THE INVENTION

This invention relates to the endothermic catalytic conversion of hydrocarbons. It particularly relates to an improved process for the dehydrogenation of ethylbenzene to styrene. More specifically, this invention relates to a method for recovering converted hydrocarbons from the effluent of a hydrocarbon conversion zone.

Those skilled in the art recognize the importance of being able to produce styrene economically since this chemical is extensively employed throughout commerce as a raw material for the production of resins, plastics, and elastomers. Specifically, styrene is copolymerized with butadiene to produce high molecular weight synthetic rubber. Although styrene may be recovered in limited quantities from various coal tars and crude oils, it is preferred to synthesize styrene by the dehydrogenation of ethylbenzene. The raw material ethylbenzene can either be separated from petroleum fractions by super-distillation or can be synthetically prepared such as through the alkylation of benzene with ethylene or ethanol.

The prior art methods for producing styrene are generally carried out by passing a mixture of ethylbenzene and steam over a fixed bed of dehydrogenation catalyst. In order to heat the reactants to the proper reaction temperature, it is also general practice to mix the ethylbenzene, which is at a temperature significantly below reaction temperature with steam which has been superheated to a temperature above reaction temperature so that the mixture is at the proper reaction temperature as it passes over the dehydrogenation catalyst. Since the basic chemical reaction involved namely, the dehydrogenation of ethylbenzene to styrene is endothermic in nature, there is associated with the reaction a significant decrease in the reaction zone temperature. It is not unusual in these prior art processes to witness a decrease of perhaps 50° F. to 150° F. within the reaction zone or through a particular catalyst bed. Naturally, since the reaction velocity constant increases with temperature, then as the temperature decreases, the rapidity and efficiency of the reaction also decreases so that the overall efficiency of the process declines to a point where it would be economically unattractive unless processing schemes were found to overcome this disadvantage.

In the dehydrogenation of ethylbenzene to styrene, significant quantities of steam are necessary for use as a heat carrier, as a diluent, and as a catalyst revivifier. Typically, this amount of steam will vary from about 2 to 4 pounds of steam per pound of ethylbenzene charged into the reaction zone. Since the energy contained in the steam is a significant operating cost, it would, therefore, be desirable to recover, in a practical sense, as much as possible of this energy. Heat exchange of the reaction zone effluent against the incoming feed stream recovers a large proportion of the sensible heat, but essentially all of the latent heat of steam is wasted or lost in the typical prior art processing scheme.

SUMMARY OF THE INVENTION

Accordingly, it is an object of this invention to effect a more economic method for dehydrogenating ethylbenzene to produce styrene in high concentration.

It is another object of this invention to provide a method for recovering converted hydrocarbons from the effluent of a hydrocarbon conversion zone in a facile and economical manner.

It is also an object of this invention to provide a method for the endothermic catalytic conversion of hydrocarbons in the presence of steam whereby the low grade heat available in the effluent stream is productively utilized.

It is still another object of this invention to provide a method for the dehydrogenation of ethylbenzene to styrene characterized by a high conversion per pass of ethylbenzene to styrene.

In accordance with the present invention, a method for recovering converted hydrocarbons from the effluent of a hydrocarbon conversion zone comprises the steps of: (a) removing from said zone at a relatively high temperature a total effluent stream comprising converted hydrocarbons and unconverted hydrocarbons; (b) passing said total effluent stream into indirect heat exchange with water under conditions sufficient to thereby generate steam at subatmospheric pressure from the water and to thereby cool said effluent to a relatively low temperature; (c) introducing said cooled effluent into a fractionation zone under conditions including hereinafter specified heat requirements sufficient to recover unconverted hydrocarbons from the converted hydrocarbons; and, (d) passing at least a portion of said generated steam of step (b) directly into said fractionation zone thereby providing at least a substantial proportion of the heat requirements for fractionation in said zone.

A specific embodiment of the present invention is the method hereinabove wherein said generated steam pressure is from 10 to 13 p.s.i.a. and said fractionation zone is maintained under subatmospheric pressure conditions.

An illustrative embodiment of the present invention includes the method hereinabove wherein said conversion zone produces styrene via the dehydrogenation of ethylbenzene, said converted hydrocarbons comprise styrene and said unconverted hydrocarbons comprise ethylbenzene.

Therefore, the essence of the present invention is the utilization of low grade steam as a means of providing, among other things, stripping and heating requirements for the product recovery fractionation facilities.

The advantages of the inventive method will be more clearly understood with reference to the attached drawing which is a schematic representation of the process flow illustrating the preferred embodiment of the invention.

DESCRIPTION OF THE DRAWING

With reference now to the attached drawing, ethylbenzene enters the process through line 10 being also admixed with recycle ethylbenzene from line 38. Typically, the ethylbenzene stream is at a temperature of about 100° F. Steam condensate from line 11 is also mixed with the ethylbenzene from line 10 and this mixture passes, preferably, via line 13 into effluent-feed exchanger 12 wherein heat is picked up for economy purposes. Additionally, in order to provide sufficient heat for reaction, superheated steam is added to the feed stream from line 33 having been superheated in superheater 34. The total mixture of ethylbenzene and steam is passed into catalytic reaction zone 15 via line 14.

Reaction zone 15 comprises, for example, three fixed beds (not shown) of catalyst for effecting the dehydrogenation reaction. The catalyst employed is, preferably, an alkali-promoted iron catalyst. Typically, such a catalyst may consist of 85% by weight of ferric oxide, 2% by weight chromia, 12% by weight of potassium hydroxide, and 10% by weight of sodium hydroxide. Other catalyst compositions include 90% by weight iron oxide, 4% by weight chromia, and 6% by weight potassium carbonate. While these known commercial dehydrogenation catalysts are preferred, other known catalyst may be used, including those comprising ferric oxide-potassium oxide, other metal oxides and/or sulfides, including those of calcium, lithium, strontium, magnesium, beryllium, zirconium, tungsten, molybdenum, titanium, hafnium, vanadium, aluminium, chromium, copper, and mixtures of two or more of the above, including chromia-alumina, alumina-titania, alumina-vanadia, etc. Similarly, the various methods of preparing the aforesaid catalysts are well known within the prior art.

The reactants enter the catalyst bed within reactor 15 at a temperature from 1000° F. to 1400° F., typically, at a temperature of about 1125° F. sufficient to convert ethylbenzene to styrene. The conditions in the, for example, first catalyst bed include not only the catalyst and temperatures as described above, but also include the weight hourly space velocity. The space velocity as used herein is defined as pounds of ethylbenzene charged per hour per pound of catalyst disposed in reactor 15. Typically, the weight hourly space velocity is within the range of about 0.1 to about 2.0, and, preferably, within the range from about 0.2 to 1.5. The space velocity at any given time is correlated with a selected inlet temperature to result in a reactor product effluent having a temperature, within the range of about 1000° F. to 1400° F., typically, 1065° F.

The amount of catalyst contained in each catalyst bed may be varied considerably. Typically, the bed depth may be in the range from two feet to six feet, the lower range being preferred to minimize pressure drop.

The reactor pressure may also be varied over a considerable range as long as sufficient diluting steam or heating gas is present to hold the partial pressure of the hydrocarbons at a low level, e.g. below atmospheric pressure. Sufficient pressure must be maintained at the reactor inlet to overcome the pressure drop through the multiple beds of catalyst contained in the reactor vessels or in separate vessels if each such bed is contained in a separate reactor. Either multiple beds contained in a single reactor or single beds in multiple reactors or mixtures of these arrangements may be used in the practice of this invention.

As the reactants contact the catalyst contained in the first catalyst bed of reactor 15, there is a temperature decrease observed across the catalyst bed due to the endothermic nature of the reaction. Accordingly, it is usual practice to introduce additional superheated steam into the effluent from the first catalyst bed in order to reheat the effluent for passage through the next catalyst bed. This procedure is typically repeated with as many catalyst beds as are desired in order to obtain a high conversion of, for example, ethylbenzene to styrene.

In any event the total effluent from reactor 15 comprises a mixture of ethylbenzene, styrene, and steam. This total effluent is withdrawn via line 16 at a temperature of say, 1065° F. and passed into exchanger 12 for preheating the feed materials as previously discussed hereinabove. The total effluent stream leaving exchanger 12 is now at a temperature of about 450° F. and is passed into quench pot 17 wherein water from line 18 and a source hereinafter specified is injected directly into admixture with the total effluent stream. The purpose of the quench is to cool the reactive products quickly in the temperature range which is most conductive to polymerization and tar formation.

The quenched effluent at a temperature of about 220° F. is withdrawn from quench pot 17 via line 19 and passed into steam generator 20 which may be of the shell and tube kettle type. Sufficient heat is released in generator 20 for the production of subatmospheric pressure steam in line 35. The steam produced will be at a temperature of from 180° F. to 212° F., typically, 200° F. and may have a pressure ranging from 6 to 14.7 p.s.i.a., typically, 11.5 p.s.i.a.

The cooled effluent is removed from the steam generator 20 via line 19, further cooled in water cooler 22 and passed into separation zone 23. Sufficient conditions are maintained in separator 23 to remove vent gases comprising to a large extent hydrogen gas via line 24, a steam condensate fraction which is removed via line 25, and a hydrocarbon fraction comprising primarily styrene, ethylbenzene, and by-products which is removed via line 39 and preferably, sent to a light ends fractionator, not shown, for the overhead separation therein of light ends by-products (benzene and toluene) from ethylbenzene and styrene. The remaining bottoms stream is supplied via line 39 to fractionator 36, wherein suitable fractionation conditions are maintained, more fully discussed hereinafter, to separate ethylbenzene as an overhead distillate fraction which is, preferably, recycled to reaction zone 15 via line 38 as previously discussed hereinabove. Styrene in high concentration is also removed from fractionation zone 36 via line 37 for further handling, including rerunning to rejector, in accordance with practices well known to those skilled in the art.

The steam condensate in line 25 is separated into at least two fractions. A first fraction in line 25 is further separated with one portion being passed via line 18 into quench pot 17 and another portion being passed via line 11 into line 10, both as previously described hereinabove.

The other portion of steam condensate from line 25 is passed via line 27 into water stripper tower 28 wherein additional steam is injected via line 29 in order to strip out contaminating hydrocarbons from the contaminated steam condensate. These hydrocarbon fractions are obtained overhead and sent via line 30 to line 19 and separator 23. If desired, the material in line 30 may, alternatively, be sent to line 19 prior to cooler 22 (by means not shown) for cooling therein.

The purified water free of hydrocarbons and polymers of styrene, now suitable for reuse in a steam generator, is withdrawn via line 31, admixed with fresh make-up boiler feed water from line 32, and passed via line 21 to steam generator 20 for the conversion therein to low pressure steam as previously described.

Returning now to steam generator 20, the subatmospheric pressure steam in line 35 is now passed into fractionating column 36, preferably, at the lower end thereof for supplying a major proportion of the heat requirements for fractionation and/or to serve as a stripping medium within fractionator 36 in order to aid in the separation of the ethylbenzene and styrene as previously discussed. By means not shown the steam which is introduced via line 35 is withdrawn together with the overhead distillate product, condensed and separated with the conensate, preferably, returned either to separator 23 for purification in stripper 28, or passed directly into steam generator 20 as recycle steam condensate.

It was found that by operating in the manner described hereinabove, that significant savings in utility costs (steam costs primarily) could be realized. For example, if the prior art steam costs were $100, the steam cost for the practice of the present invention may be in the order of about $30 to $50. This provides those skilled in the art with an idea of the magnitude of economies which can be achieved through the practice of the present invention.

Usually, the amount of steam used in admixture with the feed for the dehydrogenation of ethylbenzene to sytrene may vary from about 1 pound per pound to about 20 pounds per pound of ethylbenzene, typically, from about 2 to 4 pounds per pound. As an example, the amount of steam and ethylbenzene may be in proportion of about 2.8 pounds of steam per pound of ethylbenzene charged to the reaction zone.

The essence of the present invention, therefore, is the utilization of subatmospheric pressure steam generated from the heat contained in the effluent from the reaction zone as a heating and stripping medium in subsequent product fractionation columns. Surprisingly, steam at a pressure of from 10 to 13 p.s.i.a. is more than adequate to supply fractionation heat for a column which normally operates at 250 mm. Hg to 300 mm. Hg partial pressure of hydrocarbon at the bottom of the column.

Although the present invention has been described with reference to the appended drawing and to the reaction for the dehydrogenation of ethylbenzene to styrene, it is within the broad concept of the present invention to be equally applicable to endothermic catalytic conversion of hydrocarbons. It is particularly applicable, however, to the dehydrogenation of alkylated aromatic hydrocarbons, such as ethylbenzene, iso-propylbenzene, diethylbenzene, ethylnaphthalene, ethylchlorobenzene, etc.

The benefits to be gained by the practice of this invention are predicated on the fact that the dew point of the effluent reaction zone mixture at relatively low pressures, e.g. slightly above atmospheric, is from, say, 215° F. to 230° F. Further, the major amount of heat to be recovered is between this temperature, and the temperature at which the bulk of the material is condensed, say, 180° F. Although the amount of heat available for recovery of between, say, 230° F. and 450° F. is significant, it is not usually recoverable because of the probability of significant tar formation and subsequent fouling and plugging of exchanges, columns, etc.

PREFERRED EMBODIMENT

Therefore, according to the teachings presented hereinabove, a preferred embodiment of the present invention provides a method for producing styrene via the catalytic dehydrogenation of ethylbenzene which comprises:
(a) introducing ethylbenzene into a catalytic reaction zone maintained under conversion conditions including the presence of steam sufficient to convert at least a portion of said ethylbenzene to styrene; (b) removing from said zone a total effluent stream comprising unreacted ethylbenzene, styrene, gaseous hydrocarbons, and steam; (c) quenching said effluent by direct contact with an aqueous stream; (d) passing the quenched effluent into indirect heat exchange with hereinafter specified steam condensate under conditions sufficient to generate subatmospheric pressure steam from said condensate, and to substantially cool said effluent; (e) introducing the cooled effluent into a separation zone to produce a hydrocarbon fraction comprising ethylbenzene and styrene, and an aqueous fraction; (f) returning at least a portion of said aqueous fraction to step (c) as at least part of said aqueous stream specified; (g) recovering styrene from said hydrocarbon fraction of step (e) by fractionation in a fractionation zone maintained under fractionation conditions including the presence of hereinafter specified heating medium; and, (h) introducing the generated steam of step (d) directly into said fractionation zone as heating and stripping medium therein.

The invention claimed:
1. Method for recovering converted hydrocarbons from the effluent of a hydrocarbon conversion zone which comprises the steps of:
(a) removing from said zone at a relatively high temperature a total effluent stream comprising converted hydrocarbons and unconverted hydrocarbons;
(b) passing said total effluent stream into indirect heat exchange with water under conditions sufficient to thereby generate steam at subatmospheric pressure from the water and to thereby cool said effluent to a relatively low temperature;
(c) introducing said cooled effluent into a fractionation zone under conditions including hereinafter specified heat requirements sufficient to recover unconverted hydrocarbons from the converted hydrocarbons; and,
(d) passing at least a portion of said generated steam of step (b) directly into said fractionation zone thereby providing at least a substantial proportion of the heat requirements for fractionation in said zone.

2. Method according to claim 1 wherein said generated steam pressure is from 10 to 13 p.s.i.a. and said fractionation zone is maintained under subatmospheric pressure conditions.

3. Method according to claim 2 wherein said conversion zone produces styrene via the dehydrogenation of ethylbenzene, said converted hydrocarbons comprise styrene, and said unconverted hydrocarbons comprise ethylbenzene.

4. Method for producing styrene via the catalytic dehydrogenation of ethylbenzene which comprises:
(a) introducing ethylbenzene into a catalystic reaction zone maintained under conversion conditions including the presence of steam sufficient to convert at least a portion of said ethylbenzene to styrene;
(b) removing from said zone a total effluent stream comprising unreacted ethylbenzene, styrene, gaseous hydrocarbons, and steam;
(c) quenching said effluent by direct contact with an aqueous stream;
(d) passing the quenched effluent into indirect heat exchange with hereinafter specified steam condensate under conditions sufficient to generate subatmospheric pressure steam from said condensate, and to substantially cool said efficient;
(e) introducing the cooled effluent into a separation zone to produce a hydrocarbon fraction comprising ethylbenzene and styrene, and an aqueous fraction;
(f) returning at least a portion of said aqueous fraction of step (c) as at least part of said aqueous stream specified;
(g) recovering styrene from said hydrocarbon fraction of step (e) by fractionation in a fractionation zone maintained under fractionation conditions including the presence of hereinafter specified heating medium; and,
(h) introducing the generated steam of step (d) directly into said fractionation zone as heating and stripping medium therein.

5. Method according to claim 4 wherein said generated steam is at a pressure from 10 to 13 p.s.i.a.

References Cited

UNITED STATES PATENTS

| | | | |
|---|---|---|---|
| 3,413,217 | 11/1968 | Kunesh | 260—671 XR |
| 3,326,996 | 6/1967 | Henry et al. | 260—669 |
| 3,402,212 | 9/1968 | Gantt | 260—669 |
| 3,409,689 | 11/1968 | Ward | 260—669 |

DELBERT E. GANTZ, Primary Examiner

C. R. DAVIS, Assistant Examiner